Figure 1:
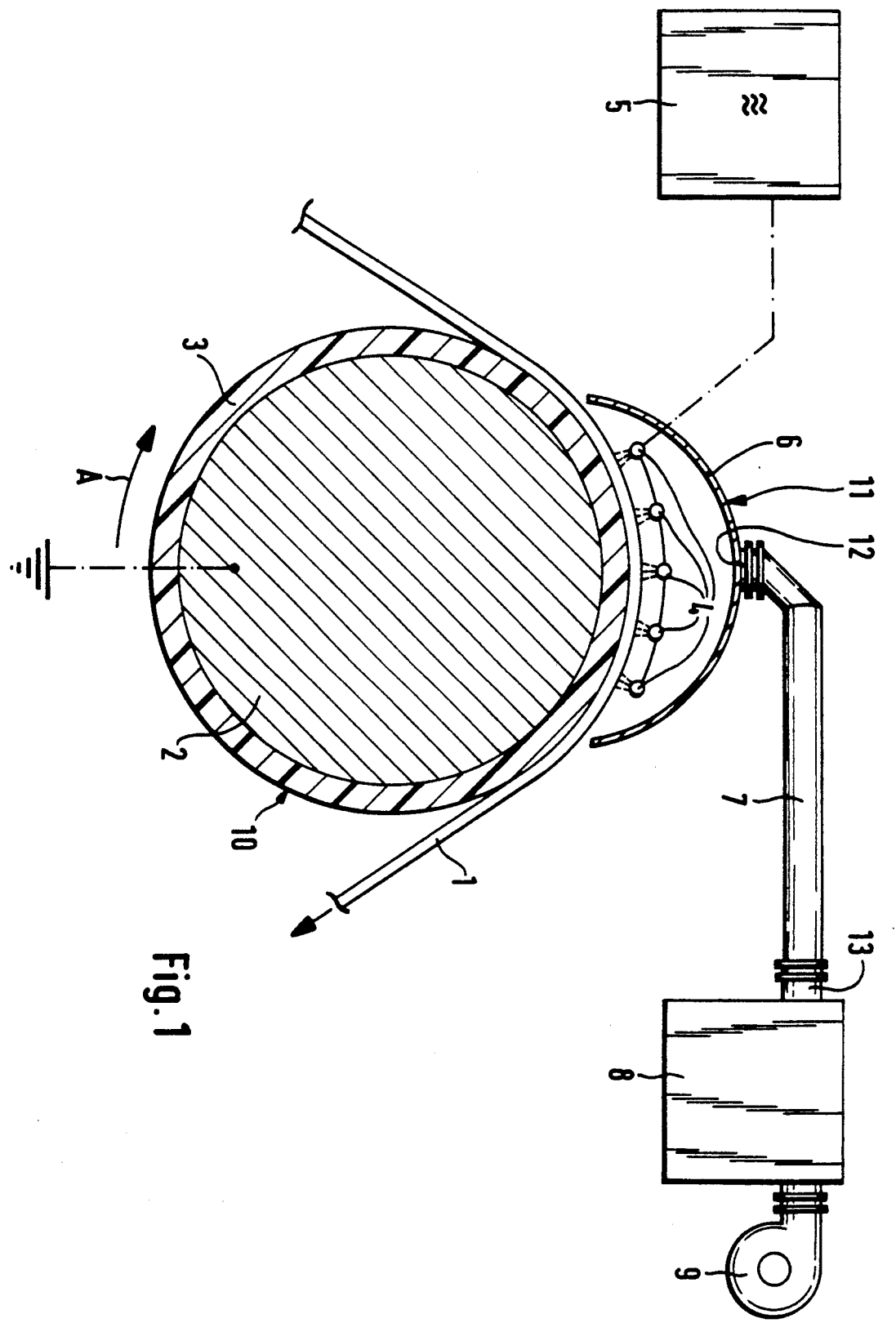

United States Patent [19]

Dinter et al.

[11] Patent Number: 5,026,463
[45] Date of Patent: * Jun. 25, 1991

[54] PROCESS AND APPARATUS FOR PREPARING THE SURFACE OF A PLASTIC MOLDING BY MEANS OF AN ELECTRICAL CORONA DISCHARGE

[75] Inventors: Peter Dinter, Oestrich-Winkel; lothar Bothe, Mainz; John D. Gribbin, Schlangenbad, all of Fed. Rep. of Germany

[73] Assignee: Hoechst Atkiengesellschaft, Frankfurt am Main, Fed. Rep. of Germany

[ * ] Notice: The portion of the term of this patent subsequent to Jul. 10, 2007 has been disclaimed.

[21] Appl. No.: 390,868

[22] Filed: Aug. 8, 1989

[30] Foreign Application Priority Data

Aug. 16, 1988 [DE] Fed. Rep. of Germany ....... 3827628

[51] Int. Cl.$^5$ .............................................. B05D 3/14
[52] U.S. Cl. ...................................... 204/164; 204/165; 204/168; 204/169; 204/170; 427/39; 427/40; 427/41; 118/620; 422/186.05; 422/907
[58] Field of Search ............... 204/164, 165, 168, 169, 204/170; 118/620; 427/38, 39, 40, 41; 422/186.05, 186.06, 907

[56] References Cited

U.S. PATENT DOCUMENTS

| | | | |
|---|---|---|---|
| 3,255,099 | 6/1966 | Wolinski | 204/165 |
| 3,274,089 | 9/1966 | Wolinski | 204/165 |
| 3,291,712 | 12/1966 | McBride | 204/165 |
| 3,396,308 | 8/1968 | Whitmore | 204/165 X |
| 3,397,132 | 8/1968 | Wolinski | 204/165 |
| 3,600,122 | 8/1971 | Coleman | 204/165 X |
| 3,661,735 | 5/1972 | Drelich | 204/165 |
| 3,974,750 | 8/1976 | Frank | 204/165 X |
| 4,188,273 | 2/1980 | Sano et al. | 204/165 X |
| 4,298,440 | 11/1981 | Hood | 204/165 |

FOREIGN PATENT DOCUMENTS

| | | |
|---|---|---|
| 133832 | 7/1984 | European Pat. Off. . |
| 279371 | 2/1988 | European Pat. Off. . |
| 3208590 | 3/1982 | Fed. Rep. of Germany . |
| 2578176 | 3/1985 | France . |

*Primary Examiner*—Nam X. Nguyen
*Attorney, Agent, or Firm*—Gregory N. Clements

[57] ABSTRACT

Moldings having a thickness of 1 to 60 mm and made of flexible webs or rigid sheet of plastic are passed through a corona discharge treatment system consisting of high-voltage electrodes and a counter-electrode and a high-frequency alternating current voltage of 20 to 25 kHz and 20 to 70 kV is applied to the high-voltage electrodes by a generator. A corona discharge forms in the gap between the high-voltage electrodes and the counter-electrode. An aerosol formed by atomizing a liquid is blown into the corona discharge zone by means of an air or gas stream. The aerosol modifies the surface of the sheet-like molding in the desired manner.

23 Claims, 4 Drawing Sheets

PROCESS AND APPARATUS FOR PREPARING THE SURFACE OF A PLASTIC MOLDING BY MEANS OF AN ELECTRICAL CORONA DISCHARGE

BACKGROUND OF THE INVENTION

1) Field Of The Invention

The invention relates to a process for pretreating the surface of a molding by means of an electrical corona discharge which takes place between high voltage electrodes and a counter-electrode, between which the molding passes, and an apparatus for pretreating the surface of the molding. The present invention is particularly suitable for moldings in the form of films having a thickness greater than 1 mm.

In many cases, the normally smooth surface of molded plastic materials, in particular of films, presents difficulties in that the film webs have extremely good slip and readily tend to telescope when being wound on a roll. Further difficulties arise during treatment of these materials to increase the adhesion of printing inks, coatings, adhesives, metals applied by vapor deposition, and the like, due to the smooth surfaces of films or molded materials. The prior art for overcoming these difficulties includes physicochemical surface modification of plastics, in particular of films. A basic process which only produces changes on the surface of the plastic consists of pretreating the surface of the plastic by means of an electrical corona discharge.

According to German Offenlegungsschrift 3,247,795, corona pretreatment of a film web of plastic is carried out by a procedure in which the upper surface and/or the lower surface of the film web are exposed to a corona which results in different pretreatment intensities. For this purpose, the film web to be treated is fed over an electrically grounded roller, and electrical charging is effected by exposure of one or both surfaces of the film web to an electrical corona discharge. The electrical corona discharge is generated by applying a high-frequency alternating current at high voltage to an electrode spaced a small distance away from the roller. The pretreatment is carried out in general in air under atmospheric pressure.

The constantly increasing market requirements of products having improved surface properties have also led to the development of processes using chemically reactive substances which, for example, cleave certain chemical bonds in the surface and thus alter the surface properties of plastics. U.S. Pat. No. 3,142,630 describes a process for increasing the adhesion, in which a film web is passed through a non-ionizing liquid and is exposed to a corona discharge in the liquid. This liquid may be, for example, a transformer cooling oil, vegetable oil or another pure oil, which is free from impurities and which is substantially electrically nonconducting.

British Patent No. 938,325 describes a process for the pretreatment of thermoplastic films, in which an electrical corona discharge takes place at the surface in a nitrogen atmosphere. The nitrogen is passed via distribution lines, through hollow electrode lines, into the corona discharge zone.

In the arrangement described in U.S. Pat. No. 3,274,089, organic compounds from the group consisting of polymerizable organic compounds, non-polymerizable organic compounds having substitutable hydrogen atoms and perhalogenated hydrogen are passed into the corona discharge zone through distribution lines in order to modify the surface of film webs or articles made of polymers.

The common feature of these known processes is that reactive gases are passed into the corona discharge region between the electrodes, or the corona discharge is allowed to take place in a non-conducting liquid.

Japanese Patent No. 17 747/73 discloses an apparatus in which a film surface is exposed to a corona discharge. The electrode connected to the generator consists of porous sintered metals and of a plurality of metal nets. The high voltage discharge electrode is shaped in such a way that liquid fed into it accumulates and is stored. As a result of the voltage applied to the discharge electrode, the stored liquid is converted into the gas phase and emerges from the porous sintered metals in the form of gas particles, which move toward the film surface under the influence of the electric field lines of the corona discharge.

In the apparatuses and processes which include a liquid as the discharge electrode in the corona discharge process, it is necessary to rely on special apparatuses which permit storage or accumulation of the liquid and furthermore must consist of a material which allows the liquid converted into the gas phase to pass there through into the corona discharge zone. If the film web to be pretreated is passed through a liquid in which the corona discharge takes place, the transport velocity of the film web through the liquid is obviously limited. If a corona discharge is effected in a reactive atmosphere on the surface of the plastic, various layers can be subsequently applied by further process measures to treat the surface of the plastic. Coating simultaneously with the pretreatment is not possible in such a case. The same applies to pretreatment of surfaces of plastics where the corona discharge is carried out on the surface in a liquid.

German Offenlegungsschrift No. 3,705,482 describes a process for the physicochemical pretreatment of the surface of moldings of plastics, in which controlled reaction mechanisms are triggered on the treated substrates by introducing liquids atomized to yield aerosols into the corona discharge. In the apparatus, the substrate to be treated is passed through a discharge gap which is formed by a roller at ground potential having a dielectric covering, as the counter-electrode, and electrodes at high voltage. The aerosol is blown into the discharge gap from a separate atomizing apparatus by means of a carrier gas. The high voltage corona generators which are available on the market and which usually produce output voltages between 5 and 25 kV are suitable for generating the high voltage required for the corona discharge. These high voltages are sufficient for striking a corona discharge in the discharge gap which is about 1.5 to 2 mm wide, and for pretreating the flexible substrates which are not more than 500 microns (0.5 mm) thick. However, these generators cannot be used for corona treatment of thick plastic sheets or moldings in the range from 1 to 60 mm. In order to be able to strike any homogeneous corona discharge at all in such large discharge gaps, extremely high voltages, which can be delivered only by specially designed generators, are required.

Owing to their chemical composition, many materials are electrically non-conducting or electrically conducting to a virtually immeasurable extent and are therefore generally regarded as insulators. However, the low conductivity of these materials is the reason why they often accumulate very high electrostatic charges at their surface which, particularly in the case of sheet-like polymer products such as disks, may have many disadvantageous effects and even make the product unusable and are therefore very undesirable. The charges are formed during production, further processing, or using the disks wherever frictional activity take place. For example, where two materials come into contact with one another and then separate again, such as at rollers during production, and they can lead to production problems, and accumulation of dust, and can influence measuring and control instruments, and can even cause explosions. High static charges (more than 5,000 V) can ignite gas/air mixtures produced by evaporating solvents, and low static charges of less than 1,000 V can optically influence or destroy the surface of film by formation of stripes and accumulation of dust and dirt.

The magnitude of the electrostatic charge depends on the electrical conductivity of the materials. Good conductors are, for example, metals, carbon black, graphite and polyenes, which lose their charge immediately; while poor conductors, in particular polymers, maintain their charge over prolonged periods, namely for seconds to minutes and even several days.

The problem with particles of plastics is generally their poor antistatic properties. Highly electrostatically charged particles of plastics present considerable difficulties during subsequent treatment steps, such as, for example, coating or printing. Regarding the printing of expanded polystyrene sheets by the screen printing technique, it is known, for example, that the electrostatic charges present on the sheet eject the printing ink filling the screen from the screen mesh, thus making printing impossible.

SUMMARY OF THE INVENTION

It is the object of the invention to design a process and an apparatus, as described at the outset, in such a way that moldings in sheet form can be pretreated with reactive substances in liquid form, and these substances can also simultaneously be applied as special layers on the surfaces of the molded materials for treating the surfaces.

This object is achieved, according to the invention, by the process described at the outset if a high-frequency alternating current voltage in the range from 20 to 70 kV at a frequency of 20 to 25 kHz is applied to the electrodes to produce a homogeneous corona discharge, and at the same time an aerosol, formed by atomizing a liquid, is introduced into the corona discharge zone by means of an air or gas stream.

Apparatus, according to the invention, for pretreating the surface of a molding by means of an electrical corona discharge, includes an electrode system which is subjected to a high-frequency alternating current of high voltage by a generator and consists of electrodes, and a counter-electrode arranged a distance away from the high voltage electrodes. The high voltage electrodes are subjected by the generator to a voltage between 20 and 70 kV at a frequency of 20 to 25 kHz and are shielded from the environment by a housing. The housing is connected via a conduit or pipe to an atomizing apparatus for atomizing liquid to yield a suspendable aerosol. The counter-electrode is equipped with a dielectric coating, over which a flexible molded sheet made of plastic is conveyed. A blower whose throughput can be regulated is connected to the atomizing apparatus and conveys the carrier gas for the aerosol through the atomizing apparatus into the housing and into the corona discharge.

In the embodiment of the apparatus, the atomizing apparatus consists of a piezoelectric ultrasonic vibrator system, or the atomizing apparatus has two-material atomizer nozzles operating at the speed of sound.

The corona discharge triggers reaction mechanisms which chemically modify the surface of the treated molding. Depending on the type of aerosol liquid used and the type of carrier gas for the aerosol, active centers are produced on the treated surface of the molding, in the form of functional groups and radicals, which constitute reactants for the applied substances in subsequent processes. Depending on the type of aerosols and carrier gases used, polymerizable or crosslinking layers can also be applied in a single process step in this way.

Because of the high voltages applied to the electrode system, tracking currents and breakdown of homogeneous corona discharge would be expected even under normal working conditions, i.e., when there is only air in the electrode gap. In particular, this danger should be expected when conductive liquid aerosols are introduced into the corona discharge. Contrary to expectations, however, neither tracking currents nor breakdown of the corona discharge is encountered when the present invention is carried out in practice.

BRIEF DESCRIPTION OF THE DRAWINGS

Details of the process according to the invention and of illustrative examples of the apparatus according to the invention are described in detail below with reference to the drawings.

FIG. 1 shows a schematic view of an apparatus for pretreating the surfaces of moldings by means of an electrical corona discharge.

FIG. 2 shows a schematic view of an apparatus for pretreating the surfaces of moldings, the apparatus comprising two corona discharge means.

FIG. 3 shows a schematic view of a further apparatus for pretreating the surfaces of moldings, having two corona discharge means.

FIG. 4 shows another embodiment of the apparatus according to the invention, having a corona discharge means, arranged at the outlet gap of a slot-like air nozzle, for pretreating the surface of a molding.

DESCRIPTION OF THE PREFERRED EMBODIMENTS

FIG. 1 shows an apparatus, consisting of a roller 10, over which sheet material 1 to be treated, for example a flexible foamed polystyrene web several millimeters thick is passed. A first corona discharge means 11 comprises a housing 6 and electrodes 4 which are connected to a generator 5. The roller 10 consists of a metallic roller core 2 having a dielectric coating 3.

The roller core 2 is grounded so that the roller 10 forms the counter-electrode to the high voltage electrodes 4 of the corona discharge means 11. The distance between the electrodes 4 and the sheet material 1 is up to about 2 mm. The roller 10 turns in the direction of the arrow A. The generator 5 subjects the electrodes 4 to a high-frequency alternating current voltage having a magnitude of 20 to 70 kV at a frequency of 20 to 25 kHz. As a result, an electrical corona discharge is created between the grounded roller 10 and the electrodes 4. The sheet material 1 is passed through the field lines of the said discharge, which are shown schematically in FIG. 1. The electrodes 4 are shielded from the environment by the housing 6, which is connected to an atomizing apparatus 8 via a line 7, for example, a rigid pipe or a hose or flexible line. The line 7 is connected at one end to a pipe socket 12 of the housing 6 and at the other end to a pipe socket 13 of the atomizing apparatus 8. In the atomizing apparatus 8, the particular liquid to be introduced is atomized to give a suspendable aerosol, which is transported into the corona discharge means 11 by air or a carrier gas stream delivered by a blower 9 whose throughput can be regulated. The atomizing apparatus 8 is a conventional two-material atomizer nozzle, in which the liquid is divided into tiny droplets by the carrier gas, for example air, emerging at the speed of sound, or is a piezoelectric ultrasonic vibrator system which, as a result of its vibrations, causes the liquid to vibrate correspondingly and divides it up into tiny droplets. The blower 9 is flanged directly to the atomizing apparatus 8. The aerosol introduced or blown into the housing 6 of the corona discharge means 11 becomes uniformly distributed inside the housing 6 and migrates along the field lines, which run from the electrodes 4 toward the sheet material 1, to the sheet surface and is deposited there. This results in very uniform wetting or coating of the sheet material 1 with the aerosol, so that very uniform modification of the surface properties of the web occurs.

The electrodes 4, as discharge electrodes, have an open design, i.e., an electrode form with a sufficiently large free cross-section between the individual electrodes. Wire electrodes arranged parallel to the axis around the circumference of the roller 10 are among electrodes which have proven suitable for this purpose. Apart from activation of the surface of the web, special coatings can be applied to the web. In many cases, extremely thin layers are sufficient for modifying the surface properties, such as, for example, antistatic properties, abrasion resistance, static and sliding friction behavior, barrier properties, adhesion and adhesion promotion of a sheet in the desired manner. Monomers, dispersions, solutions of low molecular weight and/or high molecular weight components and colloidal systems, which can be used in aqueous form or dissolved in solvents, are, inter alia, suitable for the preparation of the aerosols.

The electrodes 4 of the corona discharge means 11 are subjected by the generator 5 to an alternating current voltage between 20 and 70 kV. The alternating current voltage applied between the electrodes 4 and the roller 10 or its core 2, as the ground counter-electrode, is made proportional to the transport velocity of the sheet material 1 through the corona discharge means 11. Investigations have shown that, as the transport velocity is increased, the applied alternating current voltage delivered by the generator 5 must also be increased in order to achieve uniform modification of the surface of the sheet material 1.

This relationship between the transport velocity and the applied generator voltage is evidently due to the fact that at higher transport velocity of the sheet material 1, a larger amount of antistatic material (for example) must at the same time be sprayed onto the web in order to obtain uniform coating of the surface of the web. The amount of antistatic material supplied is increased by increasing the applied generator voltage.

Figure 2:
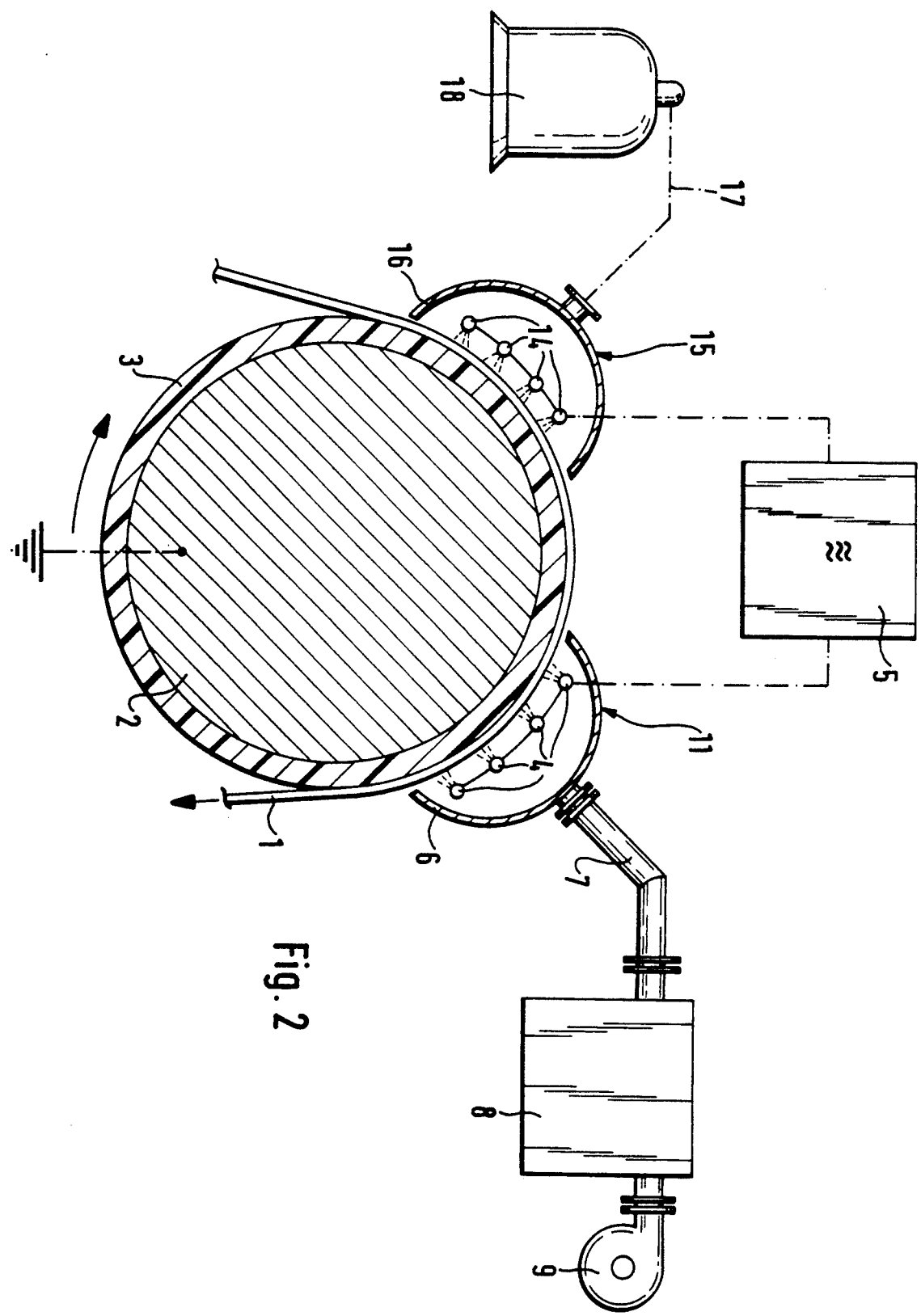

FIG. 2 shows an embodiment of the invention which has a similar structure to FIG. 1 and in which a second corona discharge means 15 is arranged upstream of the first corona discharge means 11 in the transport direction of the sheet material 1. The electrodes 14 of the second corona discharge means are shielded by a housing 16 which is connected to a gas container 18 via a line 17. The generator 5 feeds both the electrodes 4 of the first corona discharge means 11 and the electrodes 14 of the second corona discharge means 15. The other components of this arrangement, such as the atomizing apparatus 8 and the blower 9, are identical to the corresponding components of the arrangement according to FIG. 1 and will therefore not be described again. In the apparatus according to FIG. 2, a combined pretreatment of the sheet material 1 is carried out. The sheet material is first subjected to a corona discharge in a reactive atmosphere in the region of the second corona discharge means 15, i.e., surface modification of the sheet material 1, before the treatment by application of an aerosol to the sheet surface by means of the corona discharge from the first corona discharge means 11. By feeding a gas from the gas container 18 into the second corona discharge means 15, it is possible to carry out a tailored modification or activation of the web to be treated, in the corona discharge zone of the first corona discharge means 11. For example, nitrogen or other nitrogen-containing gaseous compounds can be used as the reactive gas.

The gas container 18 is connected to the housing 16 of the second corona discharge means 15 via a line 17. Usually the pressure of the gas flowing out of the gas container 18 is regulated by a pressure-reducing valve, which is not shown. FIG. 2 shows that the discharge electrodes 4 and 14 of the two corona discharge means 11 and 15 are supplied with voltage jointly by the single generator 5, although an arrangement in which the electrodes of each corona discharge means are subjected to high voltage by a separate generator is also possible.

Figure 3:
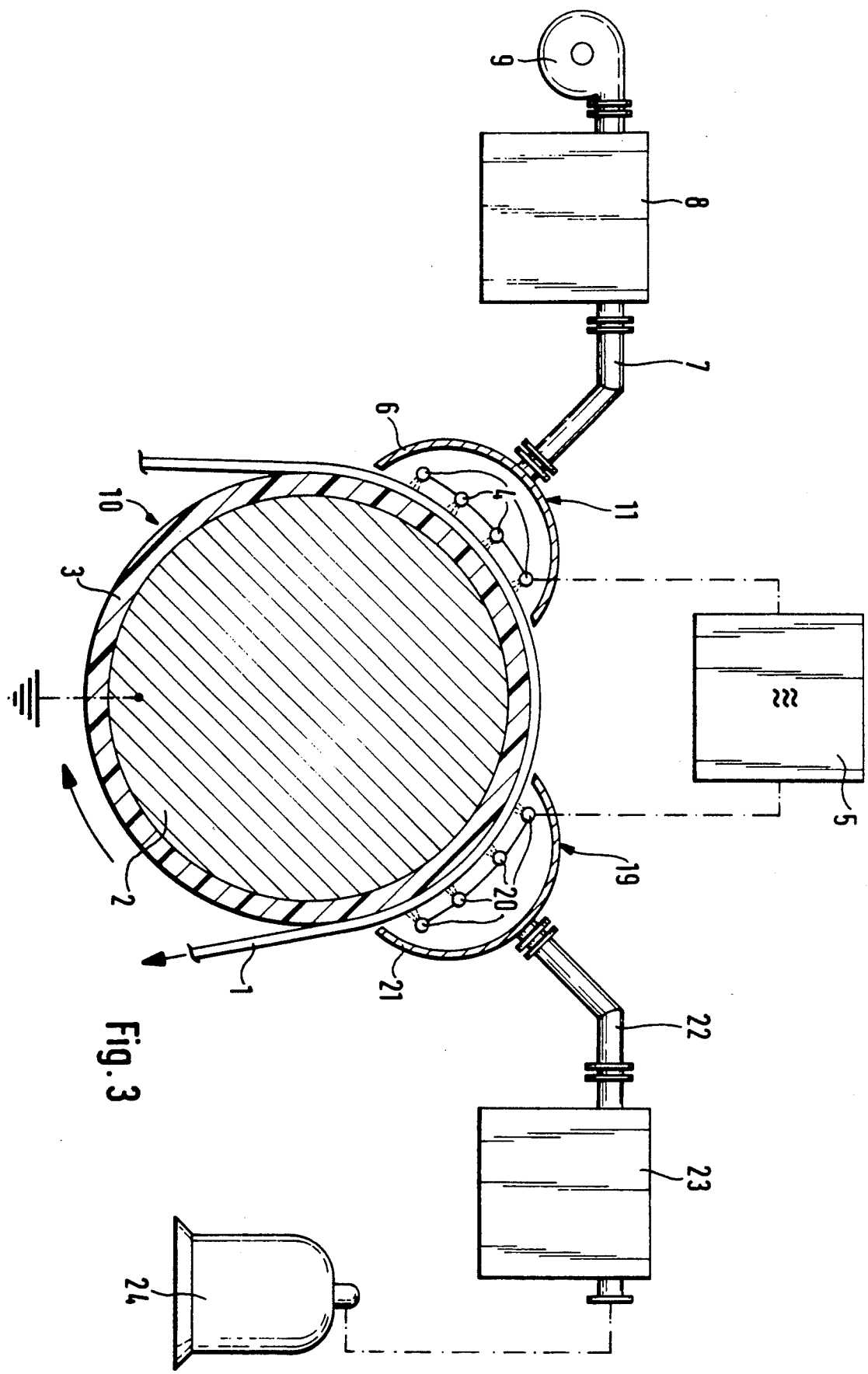

FIG. 3 shows an embodiment of the invention in which two apparatuses corresponding to the apparatus shown in FIG. 1 are arranged along the circumference of the roller 10. The first corona discharge means 11 with the connected atomizing apparatus 8 and the blower 9 substantially corresponds to the apparatus as described by FIG. 1. A third type of corona discharge means 19 having electrodes 20 is provided downstream of the first corona discharge means 11 in the transport direction of the sheet material 1. The housing 21 encloses the electrodes 20. The housing 21 is connected via a pipe socket and a line 22 to a pipe socket of an atomizing apparatus 23, to which a gas container 24 is connected. A carrier gas for the aerosol, which is produced in the atomizing apparatus 23 from the treatment liquid, is stored in the gas container 24. Other suitable carrier gases, in addition to air and nitrogen, are various noble gases.

The electrodes 4 and 20 of the first and third corona discharge means 11 and 19, respectively, are connected to the common generator 5. In this apparatus, however, it is also possible for voltage to be supplied to each of the corona discharge means via a separate generator.

Either air or a gas can be blown into the atomizing apparatus 8 via the blower 9. The air or gas serving as a carrier gas for the particular aerosol is fed into the corona discharge means 11. With the apparatus shown, two different liquids or their aerosols can be used and furthermore different carrier gases can be employed for the particular aerosol. Owing to the combination of liquid and gaseous reactants, this apparatus permits modification of the surface of the sheet material 1 in a variety of ways. Depending on the type of substances used, it is also possible to apply polymerizable or cross-linking layers to the web surface by means of the aerosols.

Figure 4:
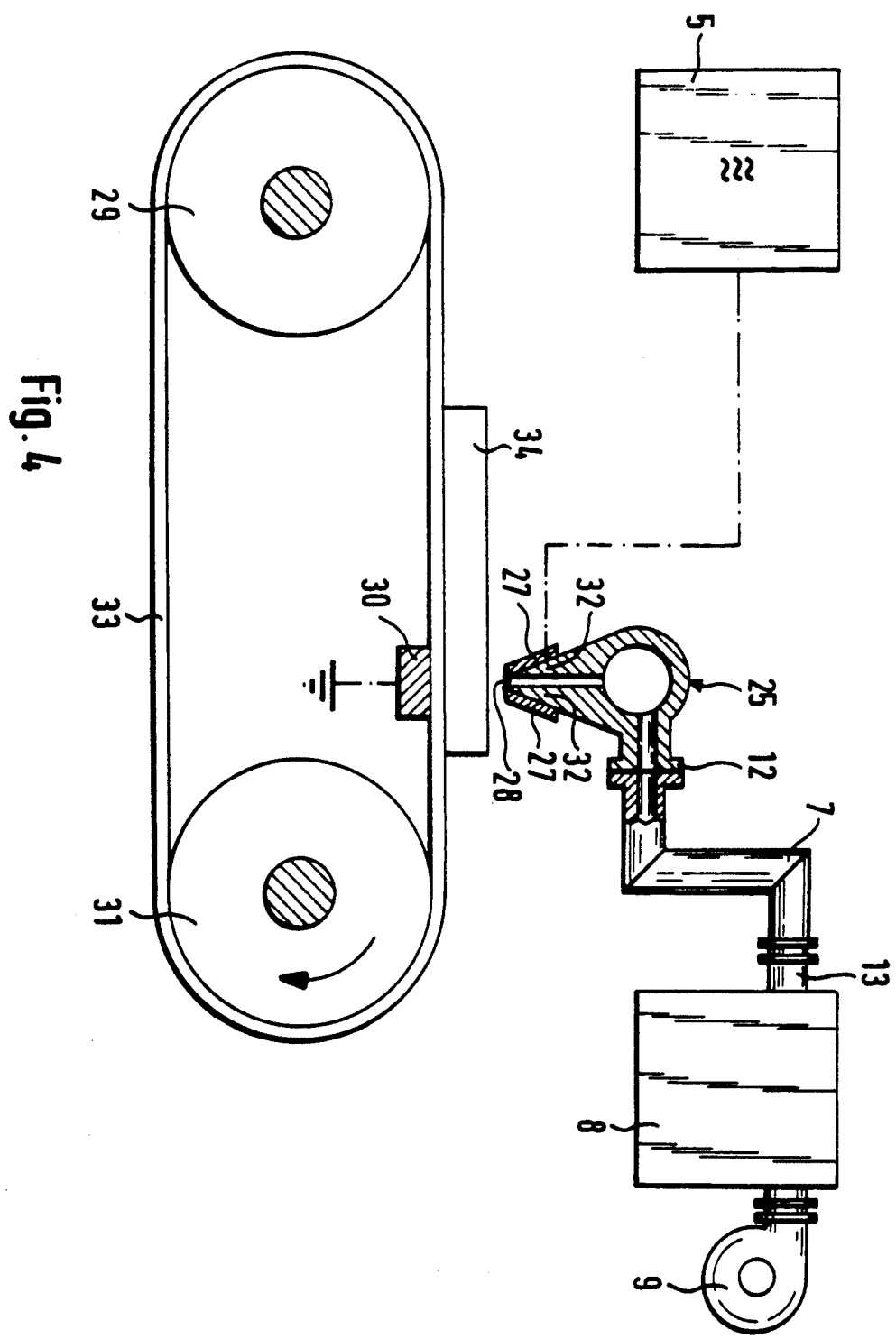

FIG. 4 shows a modified embodiment of the apparatus, which differs from the apparatuses according to FIGS. 1 to 3 in that the aerosol produced in the atomizing apparatus 8 is blown by the blower 9 via the line 7 into a slot-like air nozzle 25. The line 7 is connected to the air nozzle 25 and the atomizing apparatus 8 via pipe sockets 12 and 13. Discharge electrodes 27 which are under high voltage and in the form of flat metallic sections are attached, as integral components of the air nozzle 25, to the nozzle lips 32, 32, which define the outlet gap 28 of the air nozzle 25. The generator 5 subjects the electrodes 27 to an alternating current voltage of 20 to 70 kV at a frequency of 20 to 25 kHz. The aerosol emerging from the air nozzle 25 passes directly into the field of the corona discharge. Because of the electric field applied to the electrodes 27, the aerosol droplets are held in the electric field and are prevented from wandering about the environment in an uncontrolled manner, resulting both in further improved uniformity of the layers applied to the substrate and in substantially loss-free utilization of the amount of aerosol available.

The apparatus shown schematically in FIG. 4 permits the pretreatment of thicker, non-flexible sheets of various sizes. Here, the sheets 34 are fed by a motor-operated conveyor belt means, consisting of two guide rollers 29, 31 and a continuous conveyor belt 33. The corona discharge station consists of a grounded metallic counter-electrode 30, in the simplest case a flat plate, and the slot-like air nozzle 25 on whose nozzle lips the high voltage electrodes 27 are mounted and arranged some distance away from counter-electrode 30.

Regarding the embodiment of the continuous conveyor belt 33, there are various possibilities depending on the thickness and the insulating power of the sheets 34 to be treated. In the case of thinner sheets, the conveyor belt 33 must be made of dielectric material, such as, for example, silicone rubber or comparable materials. In the case of very thick sheets, the conveyor belt 33 may even consist of metal, with the result that it can simultaneously perform the function of the grounded counter-electrode, so that the counter-electrode 30 can be eliminated in this specific case. An intermittent corona discharge matched to the conveying cycle of the sheet material to be treated can be employed with suitable control means.

If electrically conducting substances are used for the aerosol spray, the process according to the invention must be altered in such a way that the polarity of the electrode systems, which is described in FIGS. 1 to 4, is reversed. This measure is absolutely essential; otherwise current flows away via the conducting aerosol, and the electric field required for the corona discharge therefore cannot be built up.

The process according to the invention can be used for modifying the surface of virtually all sheet materials conventionally used today. These include, for example, sheets produced by extrusion, calendering, casting, block polymerization or pressing. Whether the sheets consist of homogeneous material, have vacuoles due to expansion or are composed of layers of different materials is unimportant. Furthermore, the process is not restricted only to flat sheet-like structures but also permits the treatment of profiled sheets which have, for example, one or two wavy surfaces. It is also possible to expose both broad sides of a web or of a sheet in succession to a corona discharge in an aerosol atmosphere.

In addition to sheets of thermoplastics, such as polyester, polypropylene, polyamide, polystyrene, rigid and plasticized PVC, polyethylene, polyoxymethylene, polyphenylene oxide, polyvinylidene fluoride, acrylate/butadiene/styrene copolymers, polymethyl methacrylate and polycarbonate, sheets which consist of thermosetting phenol, urea, melamine, polyester, epoxy or silicone resins reinforced with paper, woven cotton fabrics, woven glass filament fabrics, glass fibers or woven glass fiber fabrics are also suitable for the treatment.

EXAMPLES

The Table below summarizes the effects achieved by means of the process according to the invention, for the antistatic treatment of various sheet materials.

The sheets mentioned in the Examples are treated with a 1 percent by weight aqueous solution of choline ester chloride, an antistatic agent available under the product name ®HB 155 from "Antistatik", Peter Urdal (Germany), in aerosol form, in combination with a corona pretreatment (Examples 1a–7a).

In a further series of experiments, untreated sheets are treated with a 4 percent by weight aqueous solution of a quaternary ammonium salt of the following formula:

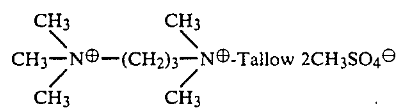

which is available under the trade mark ®Leomin FA as an antistatic agent (Examples 1b–7b).

Apparatus according to FIG. 4 was used for testing the sheets with the antistatic materials.

TABLE 1

Surface Resistance Of Various Sheet Materials, Treated With Various Antistatic Agents

| Examples | Treated Material | Surface Resistance ( ) (a) Chlorine Ester Chloride | (b) Leomin FA |
|---|---|---|---|
| 1a and 1b | Expanded polysturene<br>Density: 0.55 g/m$^2$<br>Thickness: 2 mm | $3 \times 10^7$ | $7 \times 10^7$ |
| 2a and 2b | Expanded polysturene<br>Density: 0.43 g/m$^2$<br>Thickness: 6 mm | $3 \times 10^7$ | $7 \times 10^7$ |
| 3a and 3b | Polypropylene sheet<br>Hostalen 2250<br>Thickness: 4 mm | $4 \times 10^7$ | $8 \times 10^7$ |
| 4a and 4b | Polycarbonate sheet<br>Makrolon<br>Thickness: 4 mm | $6 \times 10^7$ | $10^8$ |
| 5a and 5b | Polymethyl methacrylate sheet<br>Plexiglass XT<br>Thickness: 4 mm | $2 \times 10^7$ | $4 \times 10^7$ |
| 6a and 6b | Polyvinyl chloride sheet<br>Hostalit Z<br>Thickness: 10 mm | $3 \times 10^7$ | $7 \times 10^7$ |
| 7a and 7b | Laminated polyester sheet, obtained by pressing<br>Hostaphan films<br>Thickness: 6 mm | $4 \times 10^7$ | $7 \times 10^7$ |

The surface resistance of the untreated sheets was between $10^{13}$ and $10^{14}$ in all Examples.

That which is claimed is:

1. A process for pretreating the surface of a molding of plastic by means of an electrical corona discharge treatment taking place in the space between high voltage electrodes and a grounded counter-electrode space therefrom, said space between said high voltage electrodes and said grounded counter-electrode forming a corona discharge zone, said process comprising: locating at least a portion of said surface of said molding of plastic within said corona discharge zone; applying a high-frequency alternating current voltage in the range from 20 to 70 kV at a frequency of 20 to 25 kHz to said high-voltage electrodes to produce a homogeneous corona discharge in said corona discharge zone to corona treat said portion of said surface of said molding of plastic; and at the same time introducing, by means of a gas stream an aerosol into the corona discharge zone, said aerosol being formed by atomizing a liquid.

2. A process as claimed in claim 1, wherein the surface of the molding to be treated, is activated at the surface by a conventional corona discharge in a first step and, in a second step, is exposed to a corona discharge in an aerosol atmosphere, and, to produce both corona discharges, a high-frequency alternating current voltage in the range from 20 to 70 kV, at a frequency of 20 to 25 kHz, is applied in each case to the electrodes.

3. A process as claimed in claim 1, wherein the molding to be treated is exposed to two or more corona discharges in sequence, each of said corona discharges being produced in a different aerosol atmosphere.

4. A process as claimed in claim 1, wherein the aerosol is transported into the corona discharge zone by means of a carrier gas, of gas or gas mixtures, and said carrier gas form layers deposited on said molding by decomposition in the plasma of the corona discharge.

5. A process as claimed in claim 1, wherein aerosols of monomers, dispersions, solutions of low molecular weight and/or high molecular weight polymer components and colloidal systems in aqueous form or dissolved in solvents are introduced into said corona discharge.

6. A process as claimed in claim 1, wherein an electrically conducting aerosol is introduced into said corona discharge.

7. A process as claimed in claim 1, wherein said aerosol produced by atomization is blown into an air nozzle, and said corona discharge is ignited directly at the outlet slot of said air nozzle.

8. A process as claimed in claim 1, wherein said molding to be treated, said liquid to be atomized to give said aerosol, and the carrier gas for the aerosol are heated to a temperature between 20° C. and 95° C.

9. A process as claimed in claim 1, wherein said molding is a flat or profiled sheet of homogeneous or expanded polymer material which is rigid or flexible and which is treated with an aerosol on the surface.

10. A process as claimed in claim 1, wherein said plastic of said molding consists of a polymer matrix containing embedded electrically conducting particles or which is provided partially or completely on one or both sides with electrically conducting layers.

11. A process as claimed in claim 1, wherein each of the two broad sides of the molding is pretreated superficially by a corona discharge in an aerosol atmosphere.

12. Apparatus for pretreating the surface of a plastic molding comprising a first electrostatic corona discharge means having high voltage electrodes; a grounded counter-electrode positioned some distance away from said high voltage electrodes; a generator producing a voltage between 20 and 70 kV at a frequency of 20 to 25 kHz and electrically connected to said high voltage electrodes; a housing shielding said high voltage electrodes; an atomizing apparatus for atomizing liquid to yield a suspendable aerosol; a line connecting said housing and said atomizing apparatus; said counter-electrode being equipped with a dielectric coating, over which a flexible sheet of said molding is conveyed; and a blower connected to said atomizing apparatus for conveying a carrier gas for said aerosol through said atomizing apparatus into said housing to said corona discharge means.

13. Apparatus as claimed in claim 12, wherein said atomizing apparatus consists of a piezoelectric ultrasonic vibrator system.

14. Apparatus as claimed in claim 12, wherein said atomizing apparatus has two-material atomizer nozzles operating at the speed of sound.

15. Apparatus as claimed in claim 12, wherein a second corona discharge means having second high voltage electrodes and a second housing shielding said second high voltage electrodes are arranged adjacent said previously mentioned corona discharge means, and said second housing is connected to a source of gas.

16. Apparatus as claimed in claim 15, wherein said high voltage electrodes of said first corona discharge means and said second high voltage electrodes are connected to said generator.

17. Apparatus as claimed in claim 12, wherein a third corona discharge means having third high voltage electrodes and a third housing shielding said third high voltage electrodes is arranged downstream said first corona discharge means, seen in the direction of transport of said molding, and said third housing is connected, via a pipe, to an atomizing apparatus to which a carrier gas for said aerosol is fed from a source of gas.

18. Apparatus as claimed in claim 17, wherein said first and third high voltage electrodes of the corona discharge means are connected to said generator.

19. Apparatus for pretreating the surface of a molding comprising an electrostatic corona discharge means having high voltage electrodes; a high-frequency alternating current generator coupled to said high voltage electrodes; and a counter-electrode spaced away from said high voltage electrodes; said molding to be treated is a rigid sheet which is flat or profiled on one surface; a conveyor belt running continuously around two guide rollers, said conveyor belt transporting said molding between said high voltage electrodes and said counter-electrode; a slot-like nozzle; an atomizing apparatus for atomizing liquid to yield an aerosol; a coupling connected to said slot-like nozzle and said atomizing apparatus to transport said aerosol to said nozzle; and said high voltage electrodes positioned adjacent to said slot-like nozzle.

20. Apparatus as claimed in claim 19, wherein a blower regulating the throughput of carrier gas is connected to said atomizing apparatus whereby said carrier gas for said aerosol is conveyed through said atomizing apparatus into said slot-like nozzle.

21. Apparatus as claimed in claim 19, wherein said high voltage electrodes are flat metallic sections; said counter-electrode is a grounded metallic plate and said conveyor belt consists of a dielectric material.

22. Apparatus as claimed in claim 19, wherein said conveyor belt is a metal belt and at the same time is the grounded counter-electrode for said high voltage electrodes.

23. Apparatus as claimed in claim 19, wherein said aerosol is electrically conducting, said high voltage electrodes are grounded, and said counter-electrode is connected to said generator which produces a high-frequency alternating current voltage of 20 to 70 kV at a frequency of 20 to 25 kHz.

* * * * *